United States Patent
Barghi et al.

(10) Patent No.: US 8,891,494 B2
(45) Date of Patent: Nov. 18, 2014

(54) METHOD AND APPARATUS FOR THE USE OF MULTIPLE-INPUT, MULTIPLE OUTPUT (MIMO) SYSTEMS FOR MULTI-PACKET RECEPTION (MPR) IN A DISTRIBUTED TIME SLOT ASSIGNMENT PROTOCOL

(75) Inventors: Sanaz Barghi, Irvine, CA (US); Hamid Jafarkhani, Irvine, CA (US); Homayoun Yousefi'zadeh, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 519 days.

(21) Appl. No.: 13/269,994

(22) Filed: Oct. 10, 2011

(65) Prior Publication Data
US 2012/0026989 A1 Feb. 2, 2012

Related U.S. Application Data

(63) Continuation-in-part of application No. 13/091,075, filed on Apr. 20, 2011, now Pat. No. 8,582,526.

(60) Provisional application No. 61/327,063, filed on Apr. 22, 2010.

(51) Int. Cl.
| | |
|---|---|
| *H04J 3/00* | (2006.01) |
| *H04L 1/06* | (2006.01) |
| *H04W 72/12* | (2009.01) |
| *H04L 1/16* | (2006.01) |
| *H04W 72/08* | (2009.01) |

(52) U.S. Cl.
CPC ......... *H04L 1/0668* (2013.01); *H04W 72/1278* (2013.01); *H04L 1/1607* (2013.01); *H04W 72/082* (2013.01)
USPC ........................................................ 370/336

(58) Field of Classification Search
USPC .......................................... 370/336, 442, 458
See application file for complete search history.

(56) References Cited

U.S. PATENT DOCUMENTS

| | | | | |
|---|---|---|---|---|
| 6,317,436 | B1 * | 11/2001 | Young et al. | 370/443 |
| 2003/0067906 | A1 * | 4/2003 | Young | 370/347 |
| 2007/0104215 | A1 * | 5/2007 | Wang et al. | 370/458 |

OTHER PUBLICATIONS

Kanzaki, A.; Uemukai, T.; Hara, T.; Nishio, S., "Dynamic TDMA slot assignment in ad hoc networks," Advanced Information Networking and Applications, 2003. AINA 2003. 17th International Conference on , vol., No., pp. 330-335, Mar. 27-29, 2003.*

* cited by examiner

*Primary Examiner* — Jeffrey M Rutkowski
(74) *Attorney, Agent, or Firm* — Marcus C. Dawes; Daniel L. Dawes

(57) ABSTRACT

A method of multiple packet reception (MPR) using distributed time slot assignment (TDSA) in a multi-user network where receivers can detect two packets at the same time includes the steps of requesting information on slot assignment in a contention area, setting a frame length and acquiring a the slot assignment, selecting the assigned slot, and announcing and confirming information about the frame length and the assigned slot. The step of requesting information on slot assignment, setting a frame length and acquiring a slot assignment, and selecting the assigned slot are performed in a network where receivers can detect two packets at the same time, where time slots are assigned to nodes instead of links, where one-hop neighbors are assigned to different time slots since they may form a link together, while sharing one time slot with one of the two-hop neighbors in a non-interfering assignment.

12 Claims, 2 Drawing Sheets

METHOD AND APPARATUS FOR THE USE OF MULTIPLE-INPUT, MULTIPLE OUTPUT (MIMO) SYSTEMS FOR MULTI-PACKET RECEPTION (MPR) IN A DISTRIBUTED TIME SLOT ASSIGNMENT PROTOCOL

RELATED APPLICATIONS

The present application is related to U.S. Provisional Patent Application, Ser. No. 61/327,063, filed on Apr. 22, 2010, which is incorporated herein by reference and to which priority is claimed pursuant to 35 USC 119 and to application Ser. No. 13/091,075, filed on Apr. 20, 2011, now issued as U.S. Pat. No. 8,582,526 which is incorporated herein by reference and to which priority is claimed pursuant to 35 USC 120.

BACKGROUND OF THE INVENTION

1. Field of the Invention

The invention relates to the field of multiple-input, multiple output (MIMO) systems for multi-packet reception (MPR) in which collisions in the packets are avoided using Alamouti coding.

2. Description of the Prior Art

The use of multiple-packet reception (MPR) in wireless networks is known to improve throughput especially in high traffic conditions. The lack of synchronization among the nodes in random access systems introduces significant challenges with respect to the adoption of MPR in the physical layer (PHY) of the open systems interconnection (OSI) model and the link layer or media access control (MAC) design for systems using MPR. An instantiation of PHY connects a link layer device to a physical medium such as an optical fiber or copper cable. For example, in a wireless network the PHY portion consists of the RF, mixed-signal and analog portions, that are often called transceivers, and the digital baseband portion that place high demand on the digital signal processing (DSP) and communication algorithm processing, including channel codes. It is common that these PHY portions are integrated with the media access control (MAC) layer in system-on-a-chip (SOC) implementations.

Layered OSI architecture is the de facto standard of operation in wired networks, namely a seven layer design comprised of the physical layer (PHY), data link layer, network layer, transport layer, session layer, presentation layer and application layer. The data link layer is comprised of two sublayers, namely the logical link control sublayer (LLC) and the media access control sublayer (MAC). LLC multiplexes protocols running atop the data link layer, and optionally provides flow control, acknowledgment, and error notification. The LLC provides addressing and control of the data link. It specifies which mechanisms are to be used for addressing stations over the transmission medium and for controlling the data exchanged between the originator and recipient machines. The MAC sublayer is below the LLC sublayer and determines who is allowed to access the media at any one time. Other times it refers to a frame structure with MAC addresses inside. In wired networks, isolated-per-layer optimization techniques have been successfully and practically applied to improve network performance. However, applying per layer optimization techniques is of limited value in wireless networks due to openness of transmission media. Instead, cross-layer optimization techniques have gained widespread use in the wireless network design methodologies.

MAC protocol design within the data link layer is traditionally undertaken independently of the PHY layer. Design of the PHY layer in this case assumes that the PHY layer is incapable of detecting colliding packets and hence simultaneous transmissions always fail. In reality, multi-user detection (MUD), successive interference cancellation (SIC), and code division multiple access (CDMA) are examples of multiple packet reception (MPR) techniques wherein the PHY layer can detect more than one packet at a time. Hypothetically, detecting two packets at a time can double the throughput of a network. With MPR techniques, collisions are resolved in the PHY as opposed to the MAC layer and simultaneous transmissions are possible. While resolving collisions at the PHY layer can simplify MAC design, because the PHY can detect a number of simultaneous packet receptions, the MAC is still required to handle higher order collisions. This will remove the separation of MAC and PHY layers but allows for the enhancing of performance.

FIG. 2 is a flow diagram illustrating an embodiment of the invention which is a method of multiple packet reception (MPR) using distributed time slot assignment (DTSA) in a multi-user network where receivers can detect two packets at the same time.

In practical networks, it is almost impossible to have a fully synchronized reception from physically separated clients. At the very least, an asynchrony by a fraction of a symbol-transmission duration is always expected due to different propagation delays. Therefore, MPR methods must detect multiple asynchronous transmissions. Asynchronous MPR methods are mostly complicated. Direct sequence-code division multiple access (DS-CDMA) is one of the simple asynchronous MPR methods. However, cross-layer design techniques relying on CDMA suffer from exhaustive code search overhead. One solution has been to assign codes to different packet types instead of different users to design a MAC algorithm for multi-hop ad-hoc networks. Unfortunately, the power control overhead associated with DS-CDMA reduces the practical value of the algorithm. Under some signal-to-interference-plus-noise ratio (SINR) and timing constraints, the use of a message-in-message (MIM) scheme enables concurrent transmissions. A shuffle algorithm has been proposed to centrally schedule transmissions by different interfering access points (APs). This algorithm takes into account the timing requirements of MIM and schedules transmissions from different APs to comply with that in a manner that enables successful simultaneous transmissions. Another algorithm which targets solving the collision problem in the PHY is ZigZag decoding. Utilizing an iterative algorithm, ZigZag decoding resolves two similar consecutive collisions. Although the algorithm does not require any central decision making unit, it requires the observation of multiple collisions between two packets before decoding such collided packets.

Other simple MPR techniques are those based on multiple-input multiple-output (MIMO) systems. Switching to higher frequencies increases the feasibility of having multiple antenna users. MIMO communications enhances the performance of a wireless communication system in a number of different ways. The available diversity gain with space-time codes (STCs) enhances the link quality and can be used to increase the data rate by means of using denser signal constellations. By spatial multiplexing, for example using vertical-Bell Laboratories layered space-time (V-BLAST), several parallel independent data streams can be sent simultaneously to increase the throughput. Beamforming concentrates the transmission energy in one direction in order to increase SNR and range. On the other hand, interference nulling prevents reception from certain directions and reduces the level of interference sensed from other transmissions.

Recently, MPR methods have been developed for MIMO systems. For example, transmit antennas are not required to be on a single node in order for V-BLAST receiver to work. Therefore, multiple streams of data coming from different sources can be separated at a multiple-antenna receiver. An MPR method based on STC has also been developed for two users with two transmit antennas. Independent space-time coded streams are separable at a multiple-antenna receiver by preserving some degree of diversity.

Prior designs of a MAC for WLANs without hidden terminals have been proposed. The MAC algorithm is the same as IEEE 802.11 with request-to-send and clear-to-send (RTS/CTS) signaling except that it has additional receiver address fields in CTS and acknowledgment (ACK) frames to grant permission for the transmission of more than one node at a time. The design assumes that all nodes are single-antenna nodes and a multiple-antenna AP utilizes a multi-user detection (MUD) method to detect different data streams. However, the major drawback of the design is that it completely ignores the hidden terminal problem. More importantly, the MPR method cannot achieve good bit error rate (BER) performance and loses diversity as the number of streams to be decoded increases. When the MPR method has a high BER, long data packets will be dropped with a high probability because of the error. This degrades the throughput of the MPR system in comparison to traditional systems. The latter is due to the fact that the overhead is in the order of long data packets as opposed to short RTS packets wasted by collisions.

An important benefit of employing STC-based MPR is the providing of a high diversity order compared to other MIMO-MPR methods. An MPR-aware MAC for a WLAN has been developed based on slotted ALOHA net. The PHY layer design is a combination of spatial multiplexing and STC-based MPR. All nodes as well as the AP are two-antenna nodes. In this method, each packet is broken into two equal-length sections and sent through each antenna. The AP examines the received signal in order to find the number of simultaneously received packets. For single-packet receptions, V-BLAST is used. For double packet receptions, a retransmission follows and STC-based MPR is employed. While this MPR-aware MAC improves the performance in comparison to slotted ALOHA net, it yet again ignores the problem of hidden terminals and further assumes the nodes to be perfectly synchronized.

In the copending parent application relating to the present application we disclosed a design for a CSMA-based-MPR-aware MAC by making minimal essential modifications to the MAC algorithm of the IEEE 802.11 standard. What is needed is TDMA-based-MPR-aware design or more generally distributed time slot assignment based MPR aware design.

BRIEF SUMMARY OF THE INVENTION

The illustrated embodiments can be characterized as a method of multiple packet reception (MPR) using distributed time slot assignment (TDSA) in a multi-user network where receivers can detect two packets at the same time including the steps of requesting information on slot assignment in a contention area, setting a frame length and acquiring a the slot assignment, selecting the assigned slot, and announcing and confirming information about the frame length and the assigned slot. The step of requesting information on slot assignment, setting a frame length and acquiring a slot assignment, and selecting the assigned slot are performed in a network where receivers can detect two packets at the same time, where time slots are assigned to nodes instead of links, where one-hop neighbors are assigned to different time slots since they may form a link together, while sharing one time slot with one of the two-hop neighbors in a non-interfering assignment.

The step of requesting information on slot assignment includes information on MPR slots which are taken with two neighbors.

The step of setting a frame length and acquiring a slot assignment includes listing time slots that are MPR slots from the neighbors' point of view.

The step of selecting the assigned slot includes the steps of taking an unassigned slot (GU), taking an MPR slot (GM) for MPR extension, if there is no unassigned timeslot and at least one nonconflicting time slot exists, the new node assigns nonconflicting time slot to itself, where a nonconflicting time slot is a time slot that is not being reported as an MPR slot from one-hop neighbors, and is not occupied by one-hop neighbors; and releasing multiple assigned slots (RMA) where one of the multiple assigned time slots is released from one of its neighbor nodes to create a nonconflicting time slot and assigning the nonconflicting time slot to itself; and doubling the frame (DF). After assigning a slot to itself, the new node sends a suggestion (SUG) packet to its neighbors which has the information about the frame length and the assigned slots. After receiving the SUG packet, each neighbor updates its time slot assignment and changes its frame length accordingly. The method continues by sending a reply (REP) packet from each neighbor to their neighbors. If the new node connects two or more nodes that are assigned to the same timeslot, the new node resolves the conflict by deleting a conflicting slot, where if the conflicting nodes are assigned to multiple slots and there are some nonconflicting slots assigned to them, the new node releases the conflicting slot from all of the conflicting nodes except the node with the smallest number of assigned slots, dividing the assignment, where if multiple slots are conflicting in the new node, the new node divides the slots between the conflicting nodes, and doubling the frame and dividing the assignment.

The step of requesting information on slot assignment in a contention area occurs when a conflict takes place in an MPR DTSA network if more than two one-hop neighbors are assigned to the same time slot.

The illustrated embodiments of the invention also include an apparatus and software instructions for controlling nodes in a network stored in a nontransient tangible memory at each node in the network for performing the method of any one of the above embodiments.

While the apparatus and method has or will be described for the sake of grammatical fluidity with functional explanations, it is to be expressly understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

Figure 1:
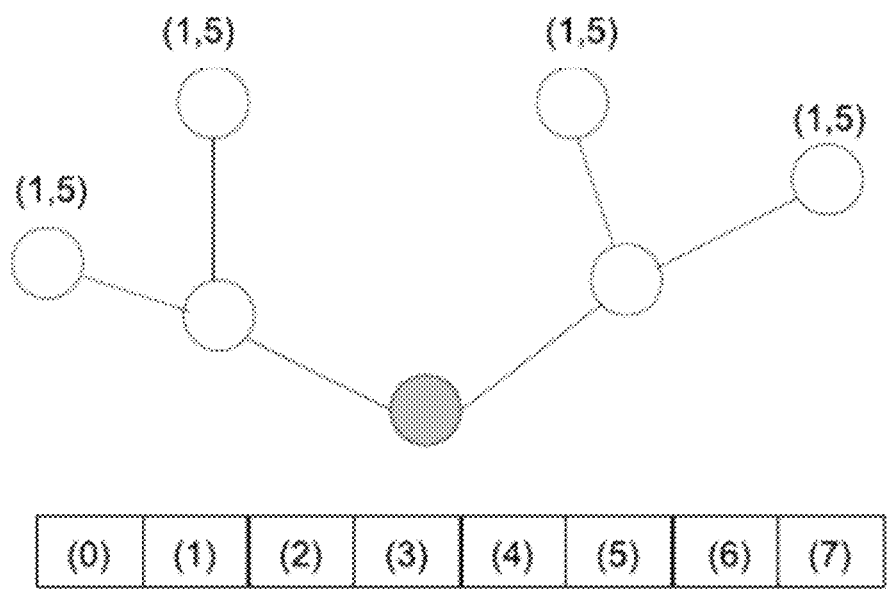
FIG. 1 is a network diagram where the shaded node is a new node and its frame length is 8. Nodes are connected with a line to their one-hop neighbors. Note that removing one of the conflicting nodes from, for example, slot (1) does not provide a nonconflicting slot.
Figure 2:
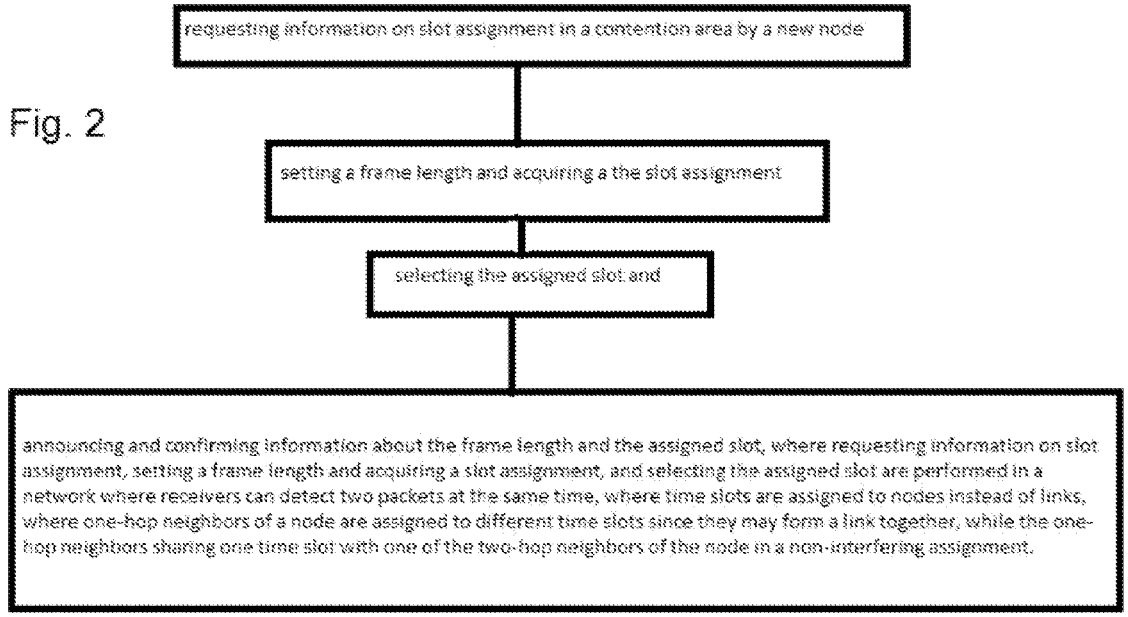

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

Consider now a multi-packet reception (MPR) extension for distributed time slot assignment (DTSA) in a multi-user network. In traditional time division multiple access (TDMA), interfering links or communication channels are not activated in the same time slot. The reason is clear, receivers in the network are not capable of decoding overlapping packets, in this case, the problem of finding non-interfering links is equivalent to finding independent sets in the interference graph of the network.

In wireless ad-hoc networks, two wireless nodes (e.g. nodes X and Y) can communicate if they are located within the transmission range (TxRange) of each other. A wireless link (e.g. link X-Y) can then be established between these two nodes. However, when a third wireless node (e.g. node Z) placed inside the interference ranges of node X and/or node Y is transmitting, link X-Y cannot transmit at the same time. Otherwise, collisions can occur and this degrades the network capacity. Link interference graphs can then be used to model these interference relationships between links. In the interference graph, a link X-Y is represented by a link vertex. Two link vertices are connected by an interference edge, if simultaneous transmission in the same channel is not possible. In order to eliminate these interference, coloring algorithms are applied to interference graphs to assign orthogonal transmission channels or to schedule transmissions.

In an interference graph each transmission link is represented by a vertex, and there is an edge between the two vertices, if and only if the transmission on at least one of the transmission links interferes with the transmission of the other one. Therefore, if we represent the transmitter and receiver phases of a transmission link A with $t_A$ and $r_A$, respectively, and of a transmission link B with $t_B$ and $r_B$, respectively, then transmission links A and B interfere if one of the followings are true in a time slot:

$t_A = t_B$
$r_A = r_B$
$t_A = r_B$ or $t_B = r_A$
$r_A/r_B$ is within the transmission range of $t_B/t_A$ In multi-hop networks, it is enough to assign node A to a time slot different from the time slot of one-hop and two-hop neighbors of node A, to have interference-free transmissions.

If receivers are capable of decoding overlapping packets, the definition of interfering links changes. Let us consider the case in which each receiver is capable of decoding up to two overlapping packets. In this scenario, two links interfere only if:

1. $t_A = t_B$
2. $t_A = r_B$ or $t_B = r_A$

In short, two links can be scheduled for simultaneous transmissions as long as the transmitter of neither one of them is a part of the other link. If two links are not interfering according to (1.) or (2.) above, more than two links are needed in order to have interference. Suppose links A, B, and C are pairwise interference free. Then, they are interfering with each other if:

3. $r_A = r_B = r_C$
4. $\exists N \in \{A,B,C\}: r_N$ is in the transmission range of $t_A$, $t_B$, $t_C$ The problem of finding non-interfering links for this scenario, will then be equivalent to finding subgraphs with degree less than two in the modified interference graph. The modified interference graph is an interference graph which has two edges between vertices associated with links that satisfy conditions 1 or 2 for interference.

The optimal solution to the TDMA time slot assignment in traditional networks is a nondeterministic polynomial-time (NP)-hard problem. There are heuristic and suboptimal solutions, such as the RAND algorithm which solves the central time slot assignment problem efficiently. In ad-hoc networks, it is important to have a suboptimal distributed algorithm that uses local topology and interference information for time slot assignments. Algorithms such as DRAND and DTSA are distributed time slot assignment algorithms.

These algorithms can be modified for multipacket reception (MPR) networks according to the disclosure below. Distributed time slot assignments (DTSA) is briefly introduced below, and then the modifications required for its extension to MPR networks (MPR DTSA) are discussed.

DTSA

Practical TDMA algorithms assign time slots to nodes instead of links. Although not a necessary condition, TDMA algorithms assign one- and two-hop neighbors to different time slots in order to avoid interference. One-hop neighbors are given different time slots, because they potentially can form a link. Two-hop neighbors are assigned to different time slots because their receivers can be in the range of the other node. Given the topology of the network, there is a minimum number of time slots that is required to guarantee that one- and two-hop neighbors can have different time-slots. Given the local topology information in the distributed algorithms, finding this number is not possible. Therefore, DTSA adjusts its frame size (number of time slots per frame) gradually and locally without the need for global topology knowledge.

DTSA takes the following steps for slot assignment:

1. Requesting information on slot assignment in the contention area:

When a node joins the network, it listens to the transmissions to find the first time slot of the frame. The first time slot of each frame is designated to transmission of control information. Then, the node sends a REQ packet in the first time slot of the next frame. All nodes receiving a REQ packet, enter the control mode and send an information (INF) packet with information on the time slots assigned to itself and its neighbors.

2. Setting the frame length and grasping the slot assignment:

In DTSA, nodes may keep different frame lengths. A new node chooses the maximum frame length in its neighborhood as its new frame length. Then, it fills up the time slots based on the time slot assignment information gathered from its neighbors:

3. Selecting an assigned slot:

Based on the information gathered from the neighbors, a new node assigns a time slot to itself following these three steps:

Getting an unassigned slot (GU)

If a slot in the frame is not assigned to any of the one- and two-hop neighbors, the new node assigns that time slot to itself. If there are more than one unassigned time slots, the new node chooses randomly among them.

Releasing multiple assigned slots (RMA)

If there is no unassigned time slot in the frame, the new node looks for nodes that are assigned to multiple time slots in the frame. Since, frame length is different for nodes in the network, it is possible to have multiple slots assigned to a node. In the latter case, the new node releases one of the multiple assigned time slots and assigns it to itself.

Doubling the frame (DF)

If the last two steps fail, the new node doubles its frame size and assigns the first slot of the second frame, which is now free, to itself.

4. Announcement and Confirmation:

After assigning a slot to itself, a new node sends a suggestion (SUG) packet to its neighbors which has the information about the frame length and the assigned slots. After receiving the SUG packet, each neighbor updates its time slot assignment and changes its frame length accordingly. Then the neighbors send a reply (REP) packet to their neighbors. This phase ends by exiting the control mode for all neighbors of the new node.

If a new node connects two or more nodes that are assigned to the same timeslot, the new node resolves the conflict as follows:

Deleting a conflicting slot:

If the conflicting nodes are assigned to multiple slots and there are some non-conflicting slots assigned to them, the new node releases the conflicting slot from all of the conflicting nodes except the node with the smallest number of assigned slots.

Dividing the assignment:

If multiple slots are conflicting in the new node, the new node divides the slots between the conflicting nodes.

Doubling the frame and dividing the assignment:

MPR DTSA

Suppose we have receivers that can detect two packets at the same time. We discussed the issue of interfering links above. If we need to assign time slots to nodes instead of links, one-hop neighbors need to be assigned to different time slots since they may form a link together, while sharing one time slot with one of the two-hop neighbors in a non-interfering assignment. Accordingly, we can update DTSA steps to transform it to MPR DTSA as follows:

Requesting the information on slot assignment in the contention area:

The INF packet has some extra information for MPR DTSA. A neighbor reporting its neighbors' time slot assignment, will report which time slots are taken with two of its neighbors. We call these time slots MPR slots.

Setting the frame length and grasping the slot assignment:

In this step, the new neighbor makes a list of time slots that are MPR slots from the neighbors' point of view.

Selecting an assigned slot. Based on the information gathered from the neighbors, a new node assigns a time slot to itself following these three steps:

A. Getting an unassigned slot (GU)

B. Getting an MPR slot (GM). This step is for the MPR extension. If there is no unassigned timeslot and at least one nonconflicting time slot exists, the new node assigns one of them to itself. A nonconflicting time slot is a time slot that is not being reported as an MPR slot from one-hop neighbors, and is not occupied by one-hop neighbors.

C. Releasing multiple assigned slots (RMA) If there is no unassigned time slot or nonconflicting timeslot in the frame, the new node releases one of the multiple assigned time slots from one of its neighbor nodes to create a non-conflicting time slot and assigns it to itself. In this step, MPR slots should be handled with more attention. For example, in the situation in FIG. 1 removing only one of the nodes from the time slots will not create a non-conflicting slot.

D. Doubling the frame (DF). Same as in DTSA.

Announcement and Confirmation:

No modification is required. Same as in DTSA.

As mentioned earlier, a conflict has a different meaning in an MPR DTSA network compared to a normal DTSA network. A conflict takes place in an MPR DTSA network if more than two one-hop neighbors are assigned to the same time slot. Although the conflicting situations are slightly different from those of normal DTSA, MPR DTSA can run the DTSA conflict resolution algorithm to resolve them. At the end, since MPR DTSA can simply become normal DTSA by adding some constraints to time slot assignments, the performance of MPR DTSA is at least as good as normal DTSA.

It is to be expressly understood that each node is a digitally communicated node, which includes either a computer or other conventional digital circuitry controlled by either firmware, nontransiently stored software or a combination of both for performing the time slot assignments and other communication tasks disclosed above. The network is illustratively considered to be a wireless network, but is to be understood to include optical fiber networks or any other type of communication system where inter-node signals may overlap in time or conflict with each other.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following invention and its various embodiments.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method of multiple packet reception (MPR) using distributed time slot assignment (DTSA) in a multi-user network where receivers can detect two packets at the same time, comprising:
    requesting information on slot assignment in a contention area by a new node, including information on MPR slots which are taken with two neighbors;
    setting a frame length and taking a slot assignment, where the new node makes a list of time slots that are MPR slots from the neighbors' point of view;
    selecting an assigned slot by:
        taking an unassigned slot (GU), taking an MPR slot (GM or MPR extension;
        if there is no unassigned timeslot and at least one nonconflicting time slot exists, the new node assigns nonconflicting time slot to itself, where a nonconflicting time slot is a time slot that is not being reported as an MPR slot from one-hop neighbors, and is not occupied by one-hop neighbors; and
        releasing multiple assigned slots (RMA) where one of the multiple assigned time slots is released from one of its neighbor nodes to create a nonconflicting time slot and assigning the nonconflicting tier e slot to itself; and doubling the frame (DF);
    after assigning a slot to itself, the new node sends a suggestion (SUG) packet to its neighbors which has the information about the frame length and the assigned slots;
    after receiving the SUG packet, each neighbor updates its time slot assignment and changes its frame length accordingly;
    sending a reply (REP) packet from each neighbor to their neighbors;
    if the new node connects two or more nodes that are assigned to the same timeslot, the new node resolves the conflict by:
        deleting a conflicting slot, where if the conflicting nodes are assigned to multiple slots and there are some nonconflicting slots assigned to them, the new node releases the conflicting slot from all of the conflicting nodes except the slot with the smallest number of assigned nodes;
        dividing the assignment, where if multiple slots are conflicting in the new node, the new node divides the slots between the conflicting nodes; and
        doubling the frame and dividing the assignment; and
    exiting the control mode for all neighbors of the new node.

2. A method of multiple packet reception (MPR) using distributed time slot assignment (DTSA) in a multi-user network where receivers can detect two packets at the same time, comprising:
    requesting information on slot assignment n a contention area by a new node;
    setting a frame length and acquiring a the slot assignment;
    selecting the assigned slot; and
    announcing and confirming information about the frame length and the assigned slot,
    where requesting information on slot assignment, setting a frame length and acquiring a slot assignment, and selecting the assigned slot are performed in a network where receivers can detect two packets at the same time, where time slots are assigned to nodes instead of links, where one-hop neighbors of a node are assigned to different time slots since they may form a link together, while the one-hop neighbors sharing one time slot with one of the two-hop neighbors of the node in a non-interfering assignment.

3. The method of claim 2 where requesting information on slot assignment includes information on MPR slots which are taken with two of the neighbors of the new node.

4. The method of claim 2 where setting a frame length and acquiring a slot assignment includes listing time slots that are MPR slots from the neighbors' point of view.

5. The method of claim 2 where selecting the assigned slot comprises:
    taking an unassigned slot (GU);
    taking an MPR slot (GM) for MPR extension;
    if there is no unassigned timeslot and at least one nonconflicting time slot exists, the new node assigns nonconflicting time slot to itself, where a nonconflicting time slot is a time slot that is not being reported as an MPR slot from one-hop neighbors, and is not occupied by one-hop neighbors; and
    releasing multiple assigned slots (RMA) where one of the multiple assigned time slots is released from one of its neighbor nodes to create a nonconflicting time slot and assigning the nonconflicting time slot to itself; and
    doubling the frame (DF);
    after assigning a slot to itself, the new node sends a suggestion (SUG) packet to its neighbors which has the information about the frame length and the assigned slots;
    after receiving the SUG packet, each neighbor updates its time slot assignment and changes its frame length accordingly;
    sending a reply (REP) packet from each neighbor to their neighbors;
    if the new node connects two or more nodes that are assigned to the same timeslot, the new node resolves the conflict by:
    deleting a conflicting slot, where if the conflicting nodes are assigned to multiple slots and there are some nonconflicting slots assigned to them, the new node releases the conflicting slot from all of the conflicting nodes except the slot with the smallest number of assigned nodes;
    dividing the assignment, where if multiple slots are conflicting in the new node, the new node divides the slots between the conflicting nodes; and
    doubling the frame and dividing the assignment.

6. A network of a plurality of nodes, each having a transmitter and a receiver, using multiple packet reception (MPR)

and using distributed time slot assignment (DTSA) in a multi-user network where the receivers can detect two packets at the same time, comprising:
- a new node for requesting information on slot assignment in a contention area by a corresponding new node, including information on MPR slots which are taken with two neighbors;
- the new node setting a frame length and taking a slot assignment, where the new node makes a list of time slots that are MPR slots from the neighbor point of view;
- the new node selecting an assigned slot by:
  - taking an unassigned slot (GU),
  - taking an MPR slot (GM) for MPR extension;
  - if there is no unassigned timeslot and at least one nonconflicting time slot exists, the new node assigns a nonconflicting time slot to the new node, where a nonconflicting time slot is a time slot that is not being reported as an MPR slot from one-hop neighbors, and is not occupied by one-hop neighbors; and
  - releasing multiple assigned slots (RMA) where one of the multiple assigned time slots is released from one of its neighbor nodes to create a nonconflicting time slot and assigning the nonconflicting time slot to itself; and
  - doubling the frame (DF);
- after assigning a slot to itself, the new node sends a suggestion (SUG) packet to its neighbors which has the information about the frame length and the assigned slots;
- after receiving the SUG packet, a neighbor node in each neighbor updates its time slot assignment and changes its frame length accordingly;
- the neighbor node for sending a reply (REP) packet from h neighbor to their neighbors;
- if the new node connects two or more nodes that are assigned to the same timeslot, the new node resolves the conflict by:
  - deleting a conflicting slot, where if the conflicting nodes are assigned to multiple slots and there are some nonconflicting slots assigned to them, the new node releases the conflicting slot from all of the conflicting nodes except the slot with the smallest number of assigned nodes;
  - dividing the assignment, where if multiple slots are conflicting in the new node, the new node divides the slots between the conflicting nodes; and
  - doubling the frame and dividing the assignment; and
- the new node exiting the control mode for all neighbor nodes of the new node.

7. A network of a plurality of nodes, each having a transmitter and a receiver, using multiple packet reception (MPR) and using distributed time slot assignment (DTSA) in a multi-user network where the receiver in each node can detect two packets at the same time, comprising:
- a new node for requesting information on slot assignment in a contention area, for setting a frame length and acquiring a the slot assignment, for selecting the assigned slot, and for announcing and confirming information about the frame length and the assigned slot; and
- where time slots are assigned to nodes instead of links, and where one-hop neighbors are assigned to different time slots since they may form a link together, while sharing one time slot with one of the two-hop neighbors in a non-interfering assignment.

8. The network of claim 7 where the new node requests information on MPR slots which are taken with two neighbors.

9. The network of claim 7 where the new node lists time slots that are MPR slots from the neighbors point of view.

10. The network of claim 7 where the new node:
- takes an unassigned slot (GU), taking an MPR slot (GM) for MPR extension;
- if there is no unassigned time slot and at least one nonconflicting time slot exists, the new node assigns nonconflicting time slot to itself, were a nonconflicting time slot is a time slot that is not being reported as an MPR slot from one-hop neighbors, and is not occupied by one-hop neighbors; and
- releases multiple assigned slots (RMA) where one of the multiple assigned time slots is released from one of its neighbor nodes to create a nonconflicting time slot and assigning the nonconflicting time slot to itself; and
- doubles the frame (DF);
- after assigning a slot to itself, the new node sends a suggestion (SUG) packet to its neighbors which has the information about the frame length and the assigned slots;
- after receiving the SUG packet, each neighbor means updates its time slot assignment and changes its frame length accordingly, sends a reply (REP) packet from each neighbor to their neighbors;
- if the new node connects two or more nodes that are assigned to the same time slot, the new node resolves the conflict by:
- deleting a conflicting slot, where if the conflicting nodes are assigned to multiple slots and there are some nonconflicting slots assigned to them, the new node releases the conflicting slot from all of the conflicting nodes except the slot with the smallest number of assigned nodes;
- dividing the assignment, where if multiple slots are conflicting in the new node, the new node divides the slots between the conflicting nodes; and
- doubling the frame and dividing the assignment.

11. A nontransient tangible memory in which software instructions for controlling nodes in a network are stored for performing the method of claim 2.

12. A method for multiple packet reception (MPR) using distributed time lot assignment (DTSA) in a multi-user network of a plurality of nodes including an inclusion of a new node, each having a transmitter and a receiver, where the receivers can detect two packets at the same time, comprising performing updated distributed time slot assignment (DTSA) where:
- the new node reports which time slots are taken with two of its neighbors as time slots MPR slots when requesting information on slot assignment in the contention area;
- the new node makes a list of time slots that are MPR slots from the neighbors' point of view when setting the frame length and grasping the slot assignment; and
- when selecting an assigned slot, if there is no unassigned timeslot and at least one nonconflicting time slot exists, the new node assigns one of them to itself, where a nonconflicting time slot is a time slot that is not being reported as an MPR slot from one-hop neighbors, and is not occupied by one-hop neighbors, or releases one of the multiple assigned time slots from one of its neighbor nodes to create a non-conflicting time slot and assigns it to itself.

* * * * *